May 12, 1959 J. B. CAMP 2,886,716
LIGHT CARRIAGE AND STRIP GUIDE MECHANISM FOR PIN HOLE DETECTOR
Filed July 23, 1957 4 Sheets-Sheet 1

INVENTOR.
JAMES B. CAMP
BY Donald G. Dalton
HIS ATTORNEY

May 12, 1959 J. B. CAMP 2,886,716
LIGHT CARRIAGE AND STRIP GUIDE MECHANISM FOR PIN HOLE DETECTOR
Filed July 23, 1957 4 Sheets-Sheet 2
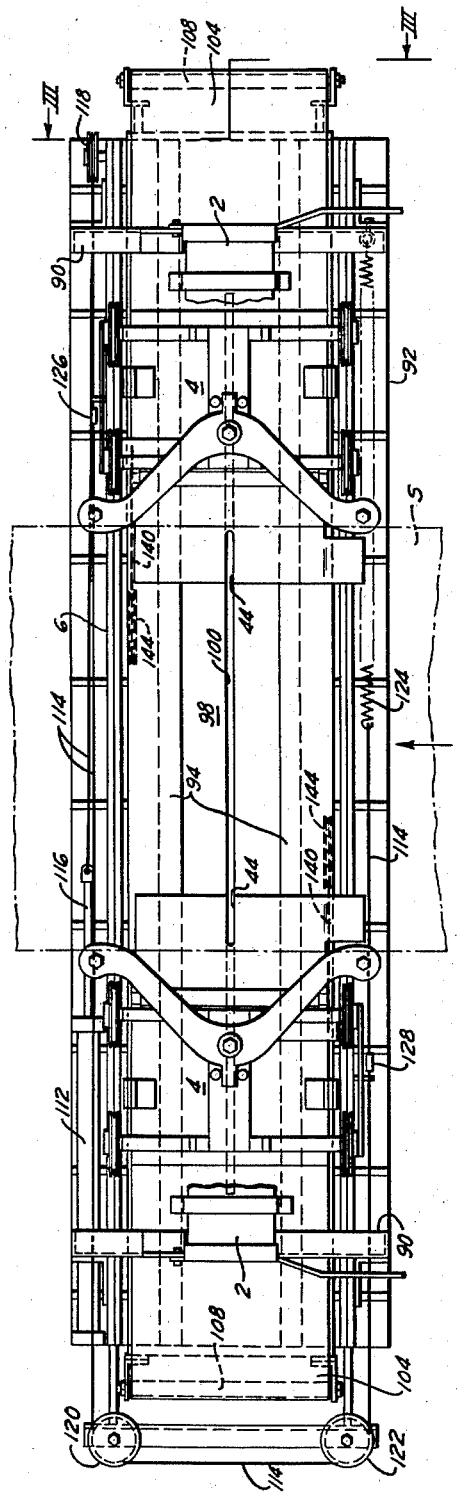
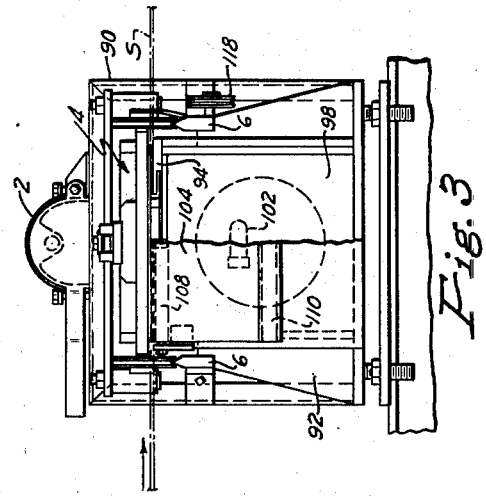
INVENTOR.
JAMES B. CAMP
BY Donald G. Dalton
HIS ATTORNEY May 12, 1959 J. B. CAMP 2,886,716
LIGHT CARRIAGE AND STRIP GUIDE MECHANISM FOR PIN HOLE DETECTOR
Filed July 23, 1957 4 Sheets-Sheet 3
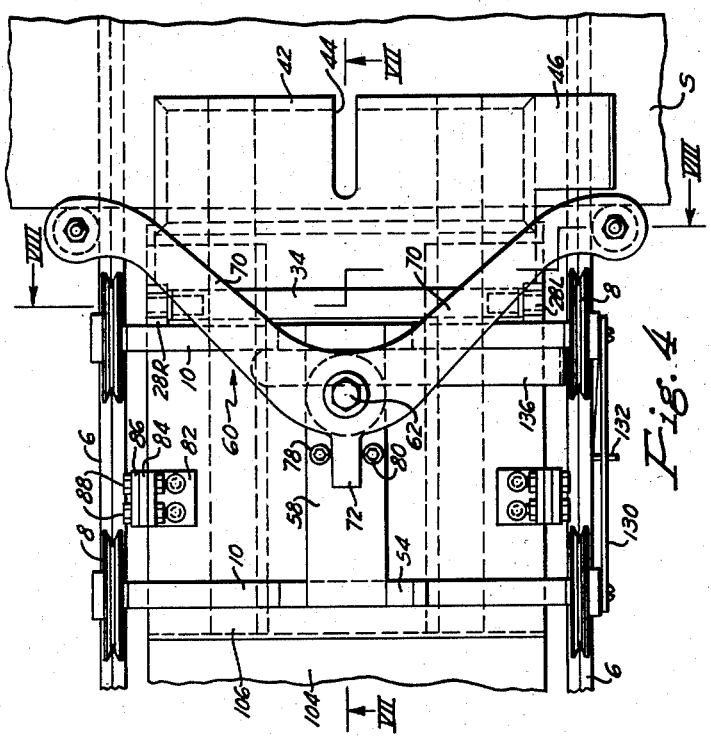
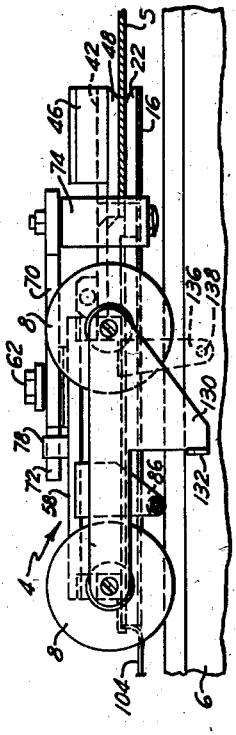
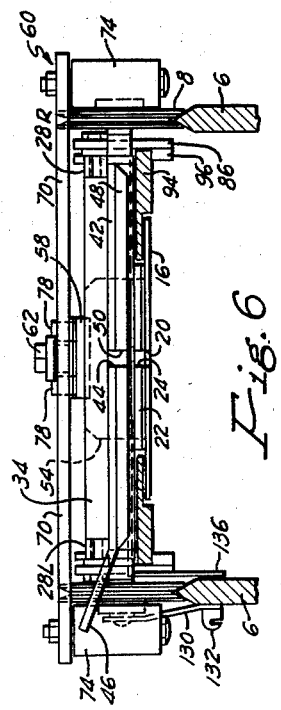
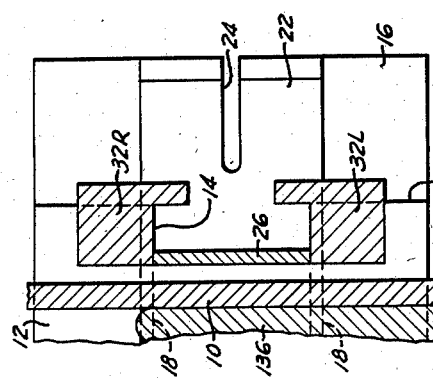
INVENTOR.
JAMES B. CAMP
BY Donald G. Dalton
HIS ATTORNEY.

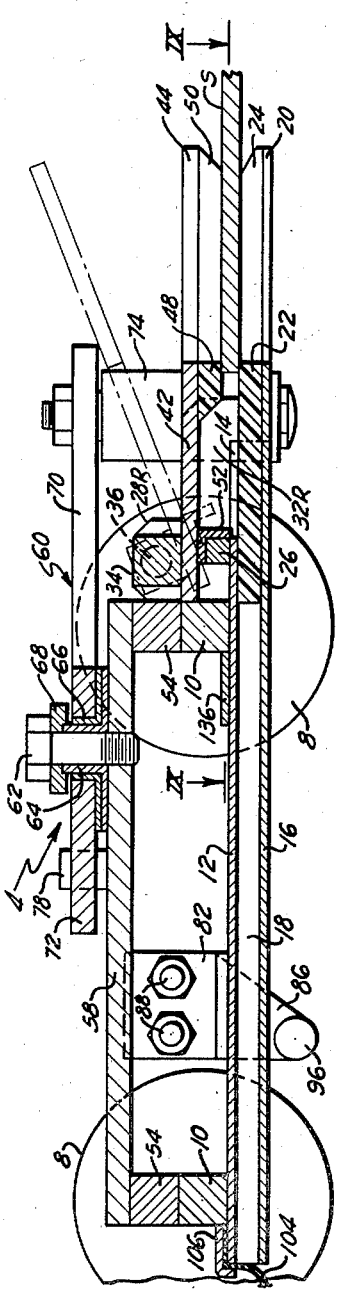

United States Patent Office 2,886,716
Patented May 12, 1959

2,886,716

LIGHT CARRIAGE AND STRIP GUIDE MECHANISM FOR PIN HOLE DETECTOR

James B. Camp, Fairfield, Ala., assignor to United States Steel Corporation, a corporation of New Jersey Application July 23, 1957, Serial No. 673,733

11 Claims. (Cl. 250—219)

This invention relates to a light carriage and strip guide mechanism for a pin hole detector and more particularly to a detector for use in inspecting continuous opaque strip such as black plate, tin plate and galvanized strip. A pin hole detector consists of a scanning unit and a control device. The scanning unit includes a light source above the strip and a light sensitive detection unit below the strip. Such apparatus is shown in Chamberlin Patent No. 2,312,626, dated March 2, 1943, and in Hags Patent No. 2,395,181, dated February 19, 1946. In the operation of such detectors it is difficult to shield the detector from stray light which may cause the detector to operate when no pin hole is present. To prevent improper operation edge guides and shields have been provided with the edge guides and shields being mounted on carriages as in the Hags patent mentioned above. However, such apparatus has not been completely satisfactory for several reasons. The light from outside sources is not entirely eliminated in all cases, the movement of the carriages may not follow the strip edges at all times, and/or the light shield may not permit irregularities such as welds on the strip to pass through unobstructed.

It is therefore an object of my invention to provide a light carriage for pin hole detectors which prevents outside light from entering the detector directly or by reflection.

Another object is to provide such apparatus in which the carriages carrying the strip guide are kept in close contact with the strip but may be easily retracted when threading strip through the line.

Still another object is to provide such apparatus in which the strip guide mechanism is so constructed that irregularities in the strip may pass through readily.

These and other objects will be more apparent after referring to the following specification and attached drawings, in which:

Figure 2 is a top plan view of the device of Figure 1 with parts broken away;

Figure 3 is a view taken on the line III—III of Figure 2;

Figure 4 is an enlarged plan view of one of the carriages and its support;

Figure 5 is a side elevation of the carriage of Figure 4;

Figure 6 is an end elevation of Figure 4 with parts of the support being shown in section;

Figure 7 is a view taken on the line VII—VII of Figure 4;

Figure 8 is a view taken on the line VIII—VIII of Figure 4; and

Figure 9 is a view taken on the line IX—IX of Figure 7.

Figure 1:
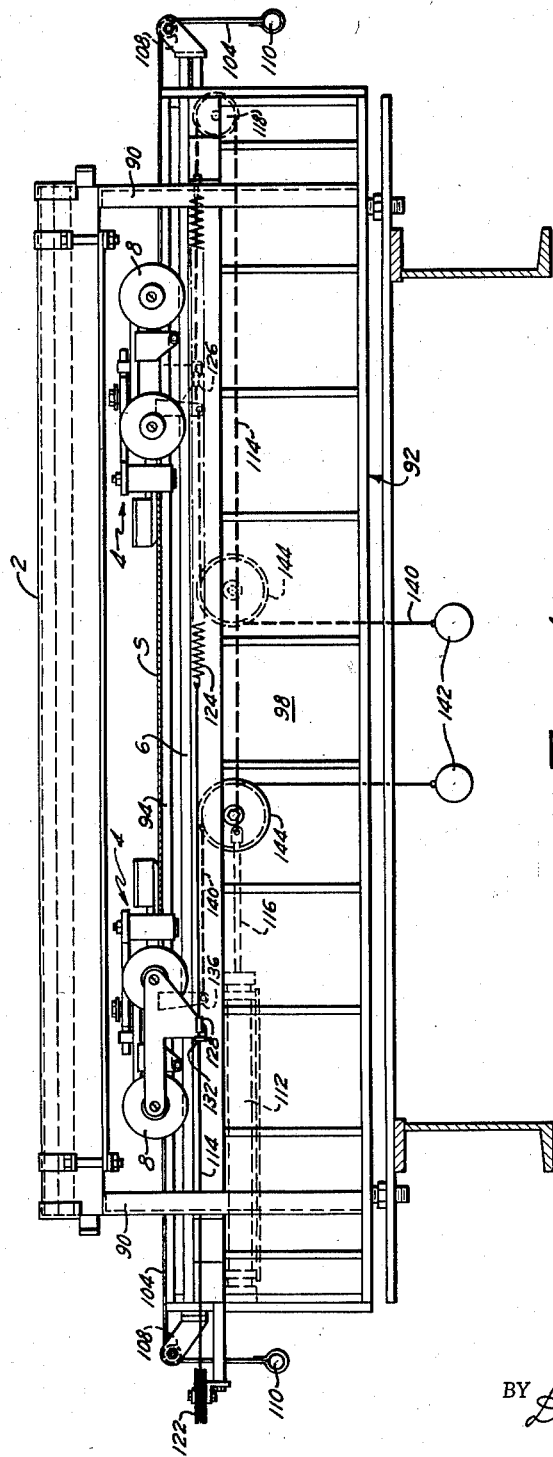
Figure 1 is a side elevation showing the light carriages.

Referring more particularly to the drawings, reference numeral 2 indicates a light source mounted above a pair of carriages 4 which are mounted one on each side of the path of travel of a strip S which is being inspected. The carriages 4 are mounted for movement transversely of the path of movement of the strip S on rails 6. The carriage 4 includes four wheels 8 which are mounted for rotation on axles 10. The axles 10 are mounted in any desired manner on top of a metal plate 12 having a cutout 14 at its inner end. Plate 16 is fastened to the lower side of plate 12 by means of bars 18 which separate the plates 12 and 16 and are secured thereto by any suitable means such as by welding or by bolts. The plate 16 extends inwardly beyond the end of plate 12 and has a light slot 20 in its inner end. A lower jaw 22 is also mounted between the plates 12 and 16 and is provided with a light slot 24 which is in line with the light slot 20. The lower jaw 22 is preferably made of hard black Micarta. A light shield block 26 is mounted on the plate 12 in any suitable manner as by means of flat head cap screws. Hinge boxes 28R and 28L are fastened to the plate 12 at the inner end thereof along its longitudinal edges. The hinge boxes extend upwardly from the base 12 and have aligned openings 30 therein. Filler blocks 32R and 32L are fastened to the plate 12 one on each side of the cutout portion 14. The filler box 32R and 32L are preferably made of hard black Micarta. A trunnion bar 34 extends between the members 28R and 28L and has a threaded axial hole 36 in each end. A trunnion bar arm 38 is threaded into each hole 36. The arm 38 has an unthreaded portion 40 which is received in the opening 30. A plate 42 is fastened to the underside of the trunnion bar 34 in any suitable manner such as by means of bolts. Plate 42 has a light slot 44 at its inner end. The strip approach end of the plate 42 is bent upwardly at 46 to provide an entry guide for the strip S. A wear plate 48 made of hard black Micarta is fastened to the underside of plate 42 and has a light receiving slot 50 therein. The slots 20, 24, 44 and 50 are in vertical alignment. A light shield angle 52 is fastened to the underside of plate 42 on the outer end thereof. The parts 22, 32R, 32L, 42, 48 and 52 form a light absorbing cavity with all the surfaces other than those formed of black Micarta being painted black. Any stray light that enters this cavity is converted into heat rather than being allowed to reflect into the detection chamber which stops at the ends of the slots 20, 24, 44, 50. The strip S extends outwardly beyond the ends of these slots into the light absorbing cavity as clearly shown in Figure 7. Thus, there can be no operation of the detector from light straying into the detection chamber. It should also be noted that the surfaces of the cavity are not in contact with the moving strip so they cannot be polished by contact with the strip. In case of welds or other irregularities in the strip S the upper jaw 42 can deflect upwardly to prevent cobbles or pile ups.

As best shown in Figures 7 and 8 a saddle block 54 is mounted on each of the axles 10 and each of the saddle blocks 54 has a slot 56 therein for receiving a saddle strap 58. An equalizer 60 is fastened to the saddle strap 58 by means of a cap screw 62. A flange bushing 64 surrounds the cap screws 62 and a flange bushing 66 surrounds the bushing 64. Bushing 64 is preferably made of brass and bushing 66 of steel. A brass cap 68 is mounted on top of the bushing 64 between the bushing 64 and the head of the cap screw 62. The equalizer 60 is provided with two inwardly extending arms 70 and a rearwardly extending arm 72 as best shown in Figure 4. A roller 74 is suspended from the end of each arm 70 and is rotatably mounted on bearings 76. A brass sleeve 78 is mounted on each side of the arm 72 and is fastened to the saddle strap 58 by means of bolt 80. The equalizer 60 can pivot around cap screw 62 a limited amount since the distance between sleeves 78 is slightly greater than the width of arm 72.

Each side of each carriage 4 carries an angle bracket 82 which is fastened to the plate 12 in any suitable manner such as by means of bolts. A spacer 84 and tension arm 86 are fastened to each of the brackets 82 by means of bolts 88. The rails 6 and a support 90 for the light source 2 are mounted on framework 92. The framework 92 carries a pair of brass rails 94 mounted below the carriages 4. A roller 96 is mounted at the bottom of each of tension arms 86 and engage the underside of the rails 94, thus preventing the carriages 4 from tilting. A box 98 located below the carriages 4 has a slot 100 therein beneath the light source 2 so as to direct light to photocells 102 located within the box 98. A flexible curtain 104 is fastened to the rear of each of the carriages 4 in any suitable manner such as by means of a clamping bar 106 as best shown in Figure 7. Each of the curtains 104 extends rearwardly over a roller 108 mounted at the end of framework 92. A counterweight 110 is attached to the free end of the curtain 104.

An air cylinder 112 is attached to the side of framework 92 in a horizontal position and a wire rope or other flexible member 114 is attached to piston rod 116 which is operated by the air cylinder 112. The wire rope 114 extends from the piston rod 116 horizontal to a sheave 118 mounted on the framework 92 with its axis horizontal, upwardly around the sheave 118 and then horizontally to the other end of framework 92 and around a horizontal sheave 120 to a second horizontal sheave 122 mounted on the side of framework 92 opposite the sheave 120. From here the wire rope 114 extends horizontally to one end of a spring 124 to which it is attached. The other end of spring 124 is mounted on the framework 92. A stop 126 is secured to the rope 114 between the sheaves 118 and 120 and a similar stop 128 is secured to the rope 114 between the sheave 122 and spring 124. A retracting bracket 130 is secured to the axles 10 of each of the carriages 4. The bracket 130 extends downwardly and has an abutment 132 which has an opening 134 therethrough for receiving the rope 114. The stops 126 and 128 are adapted to engage the abutment 132 in the manner described hereinafter. A bracket 136 is secured to each of the carriages 4 and has a downwardly extending portion which has a hole 138 therein for receiving a wire rope 140. The other end of the wire rope 140 has a counterweight 142 attached thereto. The rope 140 passes over a vertical sheave 144 mounted on framework 92.

The operation of my device is as follows:

The strip S passing between the light source 2 and the photoelectric cells 102 prevents light shining on the photocells except when a pin hole occurs in the strip. When handling narrow strip the carriages 4 are moved inwardly toward each other by means of the counterweights 142 until the outer end of the carriages are beyond the ends of slot 100. However, the curtains 104 will prevent light from shining through the slot 100 and actuating the pin hole detector. The counterweights 142 keep the rollers 74 in engagement with the strip edges at all times during operation of the pin hole detector. The pivoted arrangement of equalizer 60 allows for minor irregularities of the strip edges without displacing the carriages 4 from their tracks. As stated above the cavity formed by the parts 22, 32R, 32L, 42, 48 and 52 prevent leakage of light around the edges of the strip S so that improper operation of the pin hole detector is prevented. When irregularities appear on the strip the upper jaw 42 will pivot upwardly to the broken line position shown in Figure 7, thus permitting the strip to pass through without cobbling. When it is desired to retract the carriages 4 for threading the strip through the pin hole detector or for other reasons air is delivered into the forward end of the cylinder 112, thus pulling the piston rod 116 inwardly to the left as shown in Figure 2. This pulls the rope 114 against the action of spring 124 and causes the stops 126 and 128 to engage the abutments 132 on bracket 130 thus moving the carriages 4 rearwardly. When pressure is removed from the right end of air cylinder 112 the spring 124 pulls the wire rope 114 so that the stops 126 and 128 move away from abutments 132. Counterweights 142 then take over to move the carriages 4 inwardly toward each other. Thus it is seen that the piston rod 116 does not move during the normal operation of the pin hole detector so that there is no unnecessary wear and little inertia present.

While one embodiment of my invention has been shown and described it will be apparent that other adaptations and modifications may be made without departing from the scope of the following claims.

I claim:

1. Apparatus for guiding and shielding the edges of a strip passing through a pin hole detector or the like comprising a pair of carriages mounted for movement with respect to one another transversely of the strip, means for urging said carriages inwardly toward the edges of said strip, a bracket mounted on each of said carriages, a flexible member having a pair of stops thereon, means for pulling said flexible members so that each of said stops engages one of said brackets to move said carriages apart, guide means for the edges of said strip mounted on each of said carriages, and means on said carriages for receiving and shielding the edges of said strip.

2. Apparatus for guiding and shielding the edges of a strip passing through a pin hole detector or the like comprising a pair of carriages mounted for movement with respect to one another transversely of the strip, means for urging said carriages inwardly toward the edges of said strip, a bracket mounted on each of said carriages, a flexible member having a pair of stops thereon, means for pulling said flexible members so that each of said stops engages one of said brackets to move said carriages apart, guide means for the edges of said strip mounted on each of said carriages, and a pair of vertically spaced jaws on each of said carriages for receiving said strip therebetween, one of said jaws being mounted for pivotal movement on a substantially horizontal axis.

3. Apparatus for guiding and shielding the edges of a strip passing through a pin hole detector or the like comprising a pair of carriages mounted for movement with respect to one another transversely of the strip, means urging said carriages inwardly toward the edges of said strip, an equalizer pivotally mounted on each of said carriages, said equalizer having two spaced arms extending inwardly, a roller mounted on the end of each arm for engaging the adjacent strip edge, means limiting the pivotal movement of said equalizer, and a pair of vertically spaced jaws on each of said carriages for receiving said strip therebetween, one of said jaws being mounted for pivotal movement on a substantially horizontal axis.

4. Apparatus for guiding and shielding the edges of a strip passing through a pin hole detector or the like comprising a pair of carriages mounted for movement with the respect to one another transversely of the strip, means for urging said carriages inwardly toward the edges of said strip, a bracket mounted on each of said carriages, a flexible member having a pair of stops thereon, means for pulling said flexible members so that each of said stops engages one of said brackets to move said carriages apart, an equalizer pivotally mounted on each of said carriages, said equalizer having two spaced arms extending inwardly, a roller mounted on the end of each arm for engaging the adjacent strip edge, means limiting the pivotal movement of said equalizer, and means on said carriages for receiving and shielding the edges of said strip.

5. Apparatus for guiding and shielding the edges of a strip passing through a pin hole detector or the like comprising a pair of carriages mounted for movement with respect to one another transversely of the strip, means for urging said carriages inwardly toward the edges of said strip, a bracket mounted on each of said carriages, a flexible member having a pair of stops thereon, means for pulling said flexible members so that each of said stops engages one of said brackets to move said carriages apart, an equalizer pivotally mounted on each of said carriages, said equalizer having two spaced arms extending inwardly, a roller mounted on the end of each arm for engaging the adjacent strip edge, means limiting the pivotal movement of said equalizer, and a pair of vertically spaced jaws on each of said carriages for receiving said strip therebetween, one of said jaws being mounted for pivotal movement on a substantially horizontal axis.

6. Apparatus for guiding and shielding the edges of a strip passing through a pin hole detector or the like comprising a pair of carriages mounted for movement with respect to one another transversely of the strip, means for urging said carriages inwardly toward the edges of said strip, a bracket mounted on each of said carriages, a flexible member having a pair of stops thereon, means for pulling said flexible members so that each of said stops engages one of said brackets to move said carriages apart, an equalizer pivotally mounted on each of said carriages, said equalizer having two spaced arms extending inwardly, a roller mounted on the end of each arm for engaging the adjacent strip edge, means limiting the pivotal movement of said equalizer, a stationary lower jaw mounted on each of said carriages, an upper jaw pivotally mounted on each of said carriages above said lower jaw, said upper jaw having downwardly extending front and rear abutments thereon, vertically aligned slots in said jaws extending from their inner ends rearwardly to said front abutment, said upper and lower jaws being vertically spaced apart to receive said strip therebetween, and a filler block mounted on each side of said slots and rearwardly thereof, said filler blocks, jaws and abutments forming a light absorbing cavity.

7. Apparatus for guiding and shielding the edges of a strip passing through a pin hole detector or the like comprising a pair of carriages mounted for movement with respect to one another transversely of the strip, means for urging said carriages inwardly toward the edges of said strip, a stationary lower jaw mounted on each of said carriages, an upper jaw pivotally mounted on each of said carriages above said lower jaw, said upper jaw having downwardly extending front and rear abutments thereon, vertically aligned slots in said jaws extending from their inner ends rearwardly to said front abutment, said upper and lower jaws being vertically spaced apart to receive said strip therebetween, and a filler block mounted on each side of said slots and rearwardly thereof, said filler blocks, jaws and abutments forming a light absorbing cavity.

8. Apparatus for guiding and shielding the edges of a strip passing through a pin hole detector or the like comprising a pair of carriages mounted for movement with respect to one another transversely of the strip, means urging said carriages inwardly toward the edges of said strip, an equalizer pivotally mounted on each of said carriages, said equalizer having two spaced arms extending inwardly, a roller mounted on the end of each arm for engaging the adjacent strip edge, means limiting the pivotal movement of said equalizer, a stationary lower jaw mounted on each of said carriages, an upper jaw pivotally mounted on each of said carriages above said lower jaw, said upper jaw having downwardly extending front and rear abutments thereon, vertically aligned slots in said jaws extending from their inner ends rearwardly to said front abutment, said upper and lower jaws being vertically spaced apart to receive said strip therebetween, and a filler block mounted on each side of said slots and rearwardly thereof, said filler blocks, jaws and abutments forming a light absorbing cavity.

9. Apparatus for guiding and shielding the edges of a strip passing through a pin hole detector or the like comprising a pair of carriages mounted for movement with respect to one another transversely of the strip, means for urging said carriages inwardly toward the edges of said strip, a bracket mounted on each of said carriages, a flexible member having a pair of stops thereon, means for pulling said flexible members so that each of said stops engages one of said brackets to move said carriages apart, guide means for the edges of said strip mounted on each of said carriages, a stationary lower jaw mounted on each of said carriages, an upper jaw pivotally mounted on each of said carriages above said lower jaw, said upper jaw having downwardly extending front and rear abutments thereon, vertically aligned slots in said jaws extending from their inner ends rearwardly to said front abutment, said upper and lower jaws being vertically spaced apart to receive said strip therebetween, and a filler block mounted on each side of said slots and rearwardly thereof, said filler blocks, jaws and abutments forming a light absorbing cavity.

10. Apparatus for guiding and shielding the edges of a strip passing through a pin hole detector or the like comprising a pair of carriages mounted for movement with respect to one another transversely of the strip, means for urging said carriages inwardly toward the edges of said strip, a bracket mounted on each of said carriages, a flexible member having a pair of stops thereon, means for pulling said flexible members so that each of said stops engages one of said brackets to move said carriages apart, an equalizer pivotally mounted on each of said carriages, said equalizer having two spaced arms extending inwardly, a roller mounted on the end of each arm for engaging the adjacent strip edge, a stationary lower jaw mounted on each of said carriages, an upper jaw pivotally mounted on each of said carriages above said lower jaw, said upper jaw having downwardly extending front and rear abutments thereon, vertically aligned slots in said jaws extending from their inner ends rearwardly to said front abutment, said upper and lower jaws being vertically spaced apart to receive said strip therebetween, and a filler block mounted on each side of said slots and rearwardly thereof, said filler blocks, jaws and abutments forming a light absorbing cavity.

11. Apparatus for guiding and shielding the edges of a strip passing through a pin hole detector or the like comprising a pair of carriages mounted for movement with respect to one another transversely of the strip, means urging said carriages inwardly toward the edges of said strip, a bracket mounted on each of said carriages, a flexible member having a pair of stops thereon, means for pulling said flexible members so that each of said stops engages one of said brackets to move said carriages apart, an equalizer pivotally mounted on each of said carriages, said equalizer having two spaced arms extending inwardly, a roller mounted on the end of each arm for engaging the adjacent strip edge, a rearwardly extending arm on said equalizer, abutments engaging said last named arm for limiting pivotal movement of said equalizer, a stationary lower jaw mounted on each of said carriages, an upper jaw pivotally mounted on each of said carriages above said lower jaw, said upper jaw having downwardly extending front and rear abutments thereon, vertically aligned slots in said jaws extending from their inner ends rearwardly to said front abutment, said upper and lower jaws being vertically spaced apart to receive said strip therebetween, and a filler block mounted on each side of said slots and rearwardly thereof, said filler blocks, jaws and abutments forming a light absorbing cavity.

References Cited in the file of this patent

UNITED STATES PATENTS

| | | |
|---|---|---|
| 2,395,181 | Hags | Feb. 19, 1946 |
| 2,820,908 | Linderman | Jan. 21, 1958 |